United States Patent
Morimoto et al.

(10) Patent No.: US 7,952,672 B2
(45) Date of Patent: May 31, 2011

(54) LIQUID CRYSTAL DISPLAY DEVICE (75) Inventors: Masateru Morimoto, Mobara (JP);
Shinichi Komura, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 425 days.

(21) Appl. No.: 12/292,332

(22) Filed: Nov. 17, 2008

(65) Prior Publication Data

US 2009/0207364 A1    Aug. 20, 2009

(30) Foreign Application Priority Data

Feb. 15, 2008  (JP) .................. 2008-034177

(51) Int. Cl.
*G02F 1/1343* (2006.01)
(52) U.S. Cl. .............. 349/141; 349/41; 349/42; 349/43; 349/122; 349/139
(58) Field of Classification Search .................. 349/141, 349/41, 42, 43, 56, 122, 139, 143, 142, 144, 349/149, 147, 158

See application file for complete search history.

(56) References Cited

U.S. PATENT DOCUMENTS

| 7,800,729 B2* | 9/2010 | Ohara et al. .................. 349/143 |
| 2007/0040978 A1 | 2/2007 | Nakayoshi et al. ........... 349/141 |
| 2008/0212010 A1* | 9/2008 | Ohara et al. .................. 349/143 |
| 2009/0207364 A1* | 8/2009 | Morimoto et al. ............ 349/141 |

FOREIGN PATENT DOCUMENTS

WO   WO 2005/006068 A1   7/2003 .................... 349/141

* cited by examiner

*Primary Examiner* — Brian M Healy
(74) *Attorney, Agent, or Firm* — Stites & Harbison, PLLC; Juan Carlos A. Marquez, Esq.

(57) ABSTRACT

A liquid crystal display device which can enhance optical transmissivity is provided. One pixel region is divided into a first pixel region, a second pixel region and a third pixel region in order from one video signal line to another video signal line, the first pixel region and the third pixel region adopt the so-called IPS-Pro type structure, and the second pixel region adopts the so-called IPS structure in narrow meaning. A line width of linear electrode in the second pixel region is set to 2.5 μm or less.

14 Claims, 5 Drawing Sheets

LIQUID CRYSTAL DISPLAY DEVICE

The present application claims priority from Japanese application JP2008-34177 filed on Feb. 15, 2008, the content of which is hereby incorporated by reference into this application.

BACKGROUND OF THE INVENTION

1. Field of the Invention

The present invention relates to a liquid crystal display device, and more particularly to a liquid crystal display device which forms a plurality of linear pixel electrodes together with counter electrodes within a pixel region formed on one substrate out of a pair of substrates which sandwiches liquid crystal therebetween.

2. Background Art

This type of liquid crystal display device may be configured to apply an electric field having components parallel to a substrate to liquid crystal and such a liquid crystal display device is known as a liquid crystal display device which possesses excellent wide viewing angle characteristic (referred to as an IPS-type liquid crystal display device in broad meaning).

As this type of liquid crystal display device, when roughly classified, there have been known a usual IPS-type liquid crystal display device (also referred to as an IPS-type liquid crystal display device in narrow meaning in this specification), and a so-called IPS-Pro liquid crystal display device (being a kind of an IPS-type liquid crystal display device in broad meaning but different from an IPS-type liquid crystal display device in narrow meaning in structure).

Figure 5A:
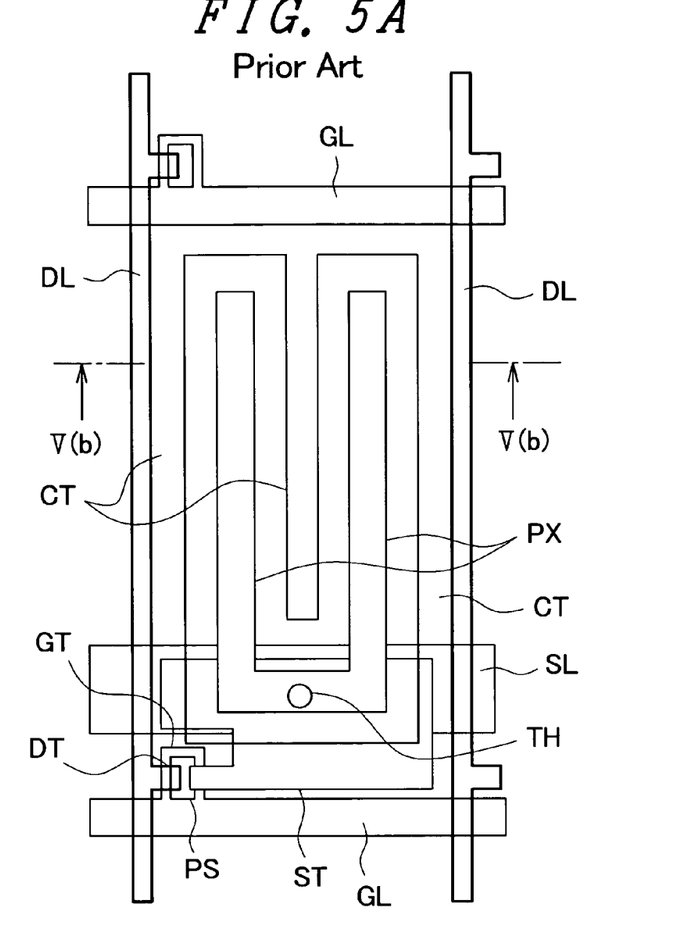
FIG. 5A to FIG. 5B are views showing the so-called narrow-meaning IPS structure and an optical transmissivity distribution curve thereof.

In the former narrow IPS-type liquid crystal display device, as shown in FIG. 5A, for example, counter electrodes CT are also constituted of a plurality of linear electrodes in the same manner as pixel electrodes PX, and the plurality of counter electrodes CT and the plurality of pixel electrodes PX are arranged alternately in the direction which intersects the longitudinal direction of these electrodes as viewed in a plan view. While the plurality of counter electrodes CT and the plurality of pixel electrodes PX may be formed on the same layer as shown in FIG. 5A, the plurality of counter electrodes CT and the plurality of pixel electrodes PX may be formed on different layers by way of an insulation film although not shown in the drawing.

Figure 6A:
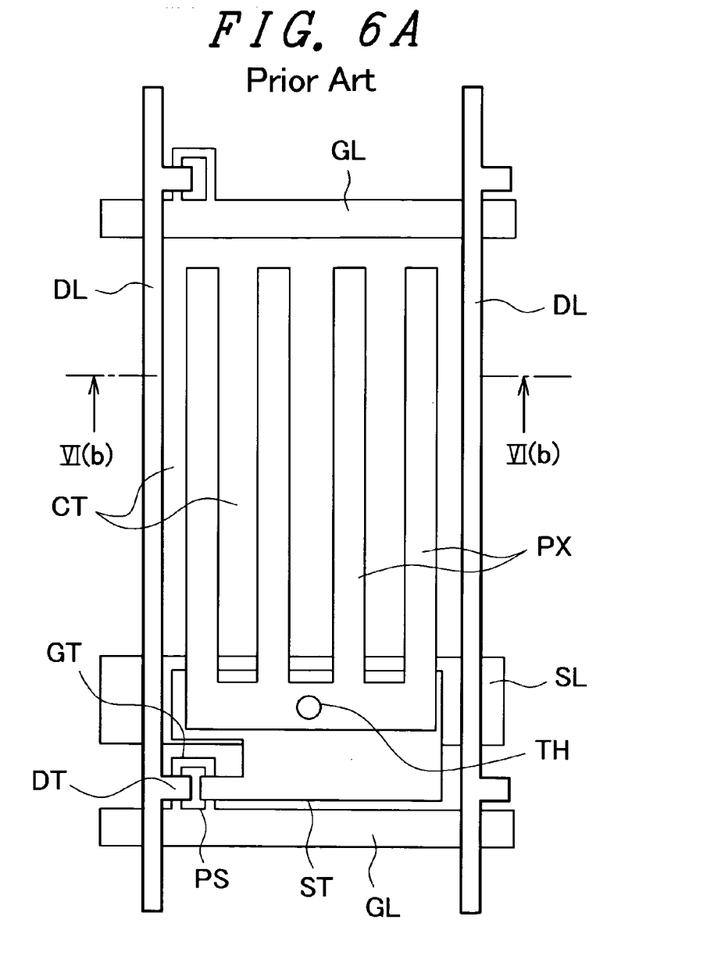
FIG. 6A to FIG. 6B are views showing the so-called IPS-Pro structure and an optical transmissivity distribution curve thereof.

In the latter IPS-Pro-type liquid crystal display device, for example, as shown in FIG. 6A, a counter electrode CT is formed of a planar electrode, and a plurality of linear pixel electrodes PX are arranged above the counter electrode CT by way of an insulation film in an overlapping manner with the counter electrode CT. Different from the constitution shown in FIG. 6A, the pixel electrode PX may be formed of a planar electrode and a plurality of linear counter electrodes CT may be arranged above the pixel electrode PX by way of an insulation film in an overlapping manner Here, both of the counter electrodes CT and the pixel electrodes PX may be formed of a transparent conductive film made of ITO (Indium Tin Oxide) or the like, for example, and hence, a numerical aperture of the pixel may be enhanced.

Here, as a document which discloses a technique relating to the present invention, WO 2005/006068 A1 (patent document 1) is named. A liquid crystal display device disclosed in patent document 1 is configured such that the IPS-type pixel constitution in narrow meaning and the IPS-Pro-type pixel constitution coexist in mixture within one pixel. That is, this liquid crystal display device is configured such that, for example, a transmissive region and a reflective region are provided within one pixel, and the transmissive region adopts the IPS-type pixel constitution in narrow meaning, the reflective region adopts the IPS-Pro-type pixel constitution, and counter electrodes are made of metal which exhibits favorable light reflectance efficiency.

SUMMARY OF THE INVENTION

However, the IPS-type liquid crystal display device in narrow meaning adopts the structure in which both of the counter electrodes CT and the pixel electrodes PX are formed of a linear electrode in a pixel region, both electrodes CT, PX are arranged not to overlap with each other, and liquid crystal is driven by an electric field generated by difference in potential between the counter electrode CT and the pixel electrode PX. Accordingly, liquid crystal molecules above the pixel electrode and the counter electrode cannot be sufficiently driven (rotated) thus giving rise to a drawback that regions where the acquisition of optical transmissivity is insufficient are present above the respective electrodes.

Figure 5B:
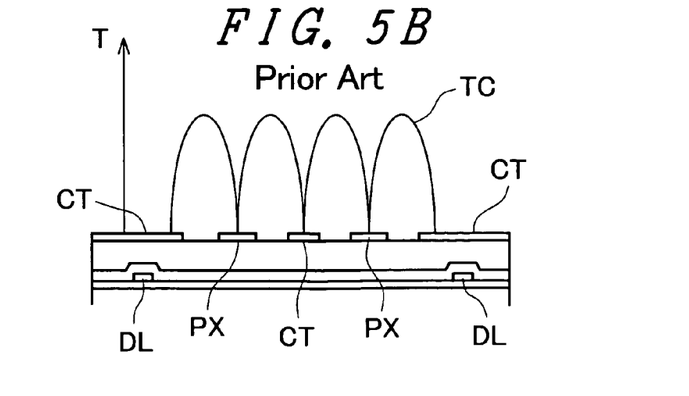

Accordingly, in view of the above, inventors of the present invention have made an analysis of the distribution of optical transmissivity in the IPS-type liquid crystal display device in narrow meaning, and have found the distribution of optical transmissivity shown in FIG. 5B. FIG. 5B is a cross-sectional view taken along a line V(b)-V(b) in FIG. 5A, wherein symbol T on an axis of ordinates indicates optical transmissivity and symbol TC indicates an optical transmissivity distribution curve. As can be understood from FIG. 5B, in the IPS-type liquid crystal display device in narrow meaning, on some regions above the pixel electrodes PX and the counter electrodes CT, regions where the optical transmissivity is low are formed. Although not shown in the drawing, also in the IPS-type structure in narrow meaning where the pixel electrodes PX and the counter electrodes CT are formed on different layers, the inventors have obtained a result substantially equal to the above-mentioned result shown in FIG. 5B.

On the other hand, to compare the IPS-Pro-type liquid crystal display device with the above-mentioned IPS-type liquid crystal display device in narrow meaning, due to the difference in structure that the pixel electrode overlaps with the counter electrode, the manner of applying the electric field to the liquid crystal (distribution of electric field) differs between the IPS-Pro-type liquid crystal display device and the above-mentioned IPS-type liquid crystal display device and hence, liquid crystal can be driven also on the pixel electrode PX to some extent. Accordingly, the IPS-Pro-type liquid crystal display device can acquire relatively high optical transmissivity.

Figure 6B:
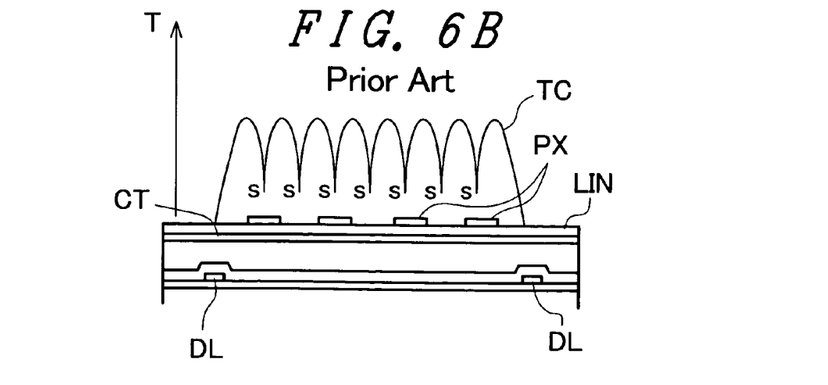

The inventors of the present invention have made an analysis of the distribution of optical transmissivity in the IPS-Pro-type liquid crystal display device, and have found the distribution of optical transmissivity shown in FIG. 6B. FIG. 6B is a cross-sectional view taken along a line VI(b)-VI(b) in FIG. 6A, wherein symbol T on an axis of ordinates indicates optical transmissivity and symbol TC indicates an optical transmissivity distribution curve. As can be understood from FIG. 6B, in the IPS-Pro-type liquid crystal display device, the optical transmissivity can be acquired to some extent also in the region above the pixel electrode PX.

However, even in such an IPS-Pro-type liquid crystal display device, portions "s" where optical transmissivity is locally low (existing linearly in plane and hence, the portions s are also referred to as dark lines) are present and such portions "s" cause the lowering of optical transmissivity when the whole pixel is taken into consideration. Further, with respect to these dark lines, attributed to the manner of distribution of an electric field in the IPS-Pro-type liquid crystal display device, the dark line also appears at the center between the neighboring pixel electrodes. Accordingly, there arises a drawback that the number of portions where the dark lines are generated within the pixel region is increased.

Further, there may be a case that the IPS-type liquid crystal display device in narrow meaning is, as shown in FIG. 5A to 5B, configured such that the counter electrodes CT are arranged so as to cover drain signal lines (video signal lines) DL which supply a video signal to the pixel electrodes PX by way of an insulation film. That is, the counter electrodes CT have a function of blocking a leaking electric field to the pixel electrodes PX from the drain signal lines DL. In this case, however, it is necessary to form the counter electrodes CT which are formed so as to cover the drain signal lines DL with a line width larger than a line width of other counter electrodes CT and hence, it is difficult to acquire sufficient optical transmissivity in such portions.

Accordingly, it is an object of the present invention to provide a liquid crystal display device which can enhance optical transmissivity of a pixel as a whole.

With respect to the optical transmissivity distribution curve TC shown in FIG. 5B, both of a line width of the pixel electrode PX and a line width of the counter electrode CT are set larger than 2.5 µm. For example, FIG. 5B shows a case in which the respective line widths of the pixel electrode PX and the counter electrode CT are set to 4.0 µm, for example. Also with respect to the optical transmissivity distribution curve TC shown in FIG. 6B, a line width of the pixel electrode PX is set larger than 2.5 µm. For example, FIG. 6B shows a case in which the line width of the pixel electrode PX is set to 4.0 µm, for example.

However, when the inventors of the present invention have further analyzed the distribution of optical transmissivity of the liquid crystal display device, in the IPS-type structure in narrow meaning, it is found that when the line width of the linear electrode is set to 2.5 µm or less, desirably 2.0 µm or less, an area of regions where the liquid crystal is inoperable is extremely decreased on the electrode and hence, optical transmissivity on the electrode is enhanced whereby the IPS-type: structure is more advantageous than the IPS-Pro-type structure with respect to optical transmissivity. Further, it is also found that, even in such a case, the IPS-Pro-type structure exhibits higher optical transmissivity than the IPS-type structure in narrow meaning at an end portion of the pixel region (in the vicinity of the drain signal line).

The liquid crystal display device of the present invention is provided for enhancing optical transmissivity of a pixel as a whole by properly arranging the so-called IPS-type pixel structure in narrow meaning and the IPS-Pro-type structure in a pixel region.

The present invention can have the following constitutions, for example.

(1) In a liquid crystal display device which includes: a first substrate; a second substrate; and a liquid crystal layer sandwiched between the first substrate and the second substrate, the first substrate includes a plurality of scanning signal lines; a plurality of video signal lines which intersects the plurality of scanning signal lines, a first insulation film which is formed above the video signal lines, a counter electrode which is formed above the first insulation film, a second insulation film which is formed above the counter electrode, and a pixel electrode which is formed above the second insulation film and to which a video signal is supplied from the video signal line via a switching element, the liquid crystal layer is configured to be driven by an electric field generated due to difference in potential between the pixel electrode and the counter electrode, the video signal line is covered with the counter electrode by way of the first insulation film, and one pixel region sandwiched between two video signal lines arranged adjacent to each other is divided into a first pixel region, a second pixel region and a third pixel region in order from one video signal line to another video signal line, wherein in the first pixel region and the third pixel region, the pixel electrode has a linear pixel electrode and has a line width of 4.0 µm or less and overlaps with the counter electrode by way of the second insulation film, and the counter electrode is provided in a projecting manner on both sides of the linear pixel electrode as viewed in a plan view, and in the second pixel region, the pixel electrode has a linear pixel electrode and has a line width of 2.5 µm or less and does not overlap with the counter electrode, and the pixel electrode and the counter electrode are alternately arranged to in a spaced-apart manner from each other in a plan view.

(2) In the liquid crystal display device having the constitution (1), the pixel electrode may have a line width of 2.0 µm or less in the second pixel region.

(3) In the liquid crystal display device having the constitution (1) or (2), the pixel electrode may have a plurality of linear pixel electrodes within said one second pixel region, and the counter electrode may have a plurality of linear counter electrodes within the second pixel region, wherein a line width of the linear counter electrode may be set to 2.5 µm or less and the number of linear counter electrodes may be set smaller than the number of plurality of linear pixel electrodes by one.

(4) In the liquid crystal display device having the constitution (3), the linear counter electrode may have a line width of 2.0 µm or less in the second pixel region.

(5) In the liquid crystal display device having the constitution (1) or (2), the pixel electrode may have only one linear pixel electrode within said one second pixel region, and the counter electrode in the first pixel region and the counter electrode in the third pixel region may also function as the counter electrode in the second pixel region.

(6) In the liquid crystal display device having any one of the constitutions (1) to (5), assuming two pixel regions arranged adjacent to each other while sandwiching the video signal line therebetween as one pixel region and another pixel region, the counter electrode may be shared in common by said one pixel region and said another pixel region.

(7) In the liquid crystal display device having any one of the constitutions (1) to (6), each one of the counter electrode and the pixel electrode respectively may have a bent portion at a part of a portion thereof which extends in the running direction of the video signal line.

(8) In a liquid crystal display device which includes: a first substrate; a second substrate; and a liquid crystal layer sandwiched between the first substrate and the second substrate, the first substrate includes a plurality of scanning signal lines; a plurality of video signal lines which intersects the plurality of scanning signal lines, a first insulation film which is formed above the video signal lines, a counter electrode which is formed above the first insulation film, a second insulation film which is formed above the counter electrode, and a pixel electrode which is formed above the second insulation film and to which a video signal is supplied from the video signal line via a switching element, the liquid crystal layer is configured to be driven by an electric field generated due to difference in potential between the pixel electrode and the counter electrode, the counter electrode include first counter electrode which extends in the running direction of the video signal line, has a width larger than a width of the video signal line, and covers the video signal line by way of the first insulation film, the pixel electrode includes, within one pixel region, two first pixel electrodes which extend in the running direction of the video signal line, and one or a plurality of second pixel electrodes which is arranged between the two first pixel electrodes and extends in the running direction of the video signal line, and assuming the two first counter electrodes arranged adjacent to each other as one first counter electrode and another first counter electrode respectively and assuming the two first pixel electrodes as one first pixel electrode and another first pixel electrode, said one first pixel electrode overlaps with said one first counter electrode by way of the second insulation film, said another first pixel electrode overlaps with said another first counter electrode by way of the second insulation film, the second pixel electrode is arranged between said one first counter electrode and said another first counter electrode such that the second pixel electrode does not overlap with the counter electrode, an end portion of said one first counter electrode is positioned between said one first pixel electrode and said second pixel electrode, and an end portion of said another first counter electrode is positioned between said another first pixel electrode and said second pixel electrode as viewed in a plan view, and the first pixel electrode is linearly formed and has a line width of 4.0 µm or less, and the second pixel electrode is linearly formed and has a line width of 2.5 µm or less.

(9) In the liquid crystal display device having the constitution (8), the line width of the second pixel electrode may be set to 2.0 µm or less.

(10) In the liquid crystal display device having the constitution (8) or (9), the pixel electrode may have the plurality of second pixel electrodes within said one pixel region, the counter electrode may have one or a plurality of second counter electrodes which extends in the running direction of the video signal line between said one first counter electrode and said another first counter electrode, the second pixel. electrode and the second counter electrode may be alternately arranged while preventing the second pixel electrode and the second counter electrode from overlapping with each other, and the second counter electrode may be formed linearly and may have a line width of 2.5 µm or less.

(11) In the liquid crystal display device having the constitution (10), the line width of the second counter electrode may be set to 2.0 µm or less.

(12) In the liquid crystal display device having the constitution (8) or (9), the pixel electrode may have only one second pixel electrode within said one second pixel region.

(13) In the liquid crystal display device having any one of the constitutions (8) to (12), assuming two pixel regions arranged adjacent to each other while sandwiching the video signal line therebetween as one pixel region and another pixel region, the first counter electrode may be shared in common by said one pixel region and said another pixel region.

(14) In the liquid crystal display device having any one of the constitutions (8) to (13), each one of the counter electrode and the pixel electrode respectively may have a bent portion at a part of a portion thereof which extends in the running direction of the video signal line.

The above-mentioned constitutions merely constitute examples and the present invention can be suitably modified without departing from the technical concept of the present invention. Constitutional example of the present invention other than the above-mentioned constitutions will become apparent from the description of the whole specification relating to the present invention.

According to the liquid crystal display device of the present invention, optical transmissivity of pixels can be enhanced.

Other advantages of the present invention will become apparent from the description of the whole specification.

DESCRIPTION OF THE PREFERRED EMBODIMENTS

Embodiments of the present invention are explained in conjunction with drawings. Here, in the respective drawings, identical or similar constitutional components are given same symbols and their repeated explanation is omitted.

Embodiment 1

Figure 1:
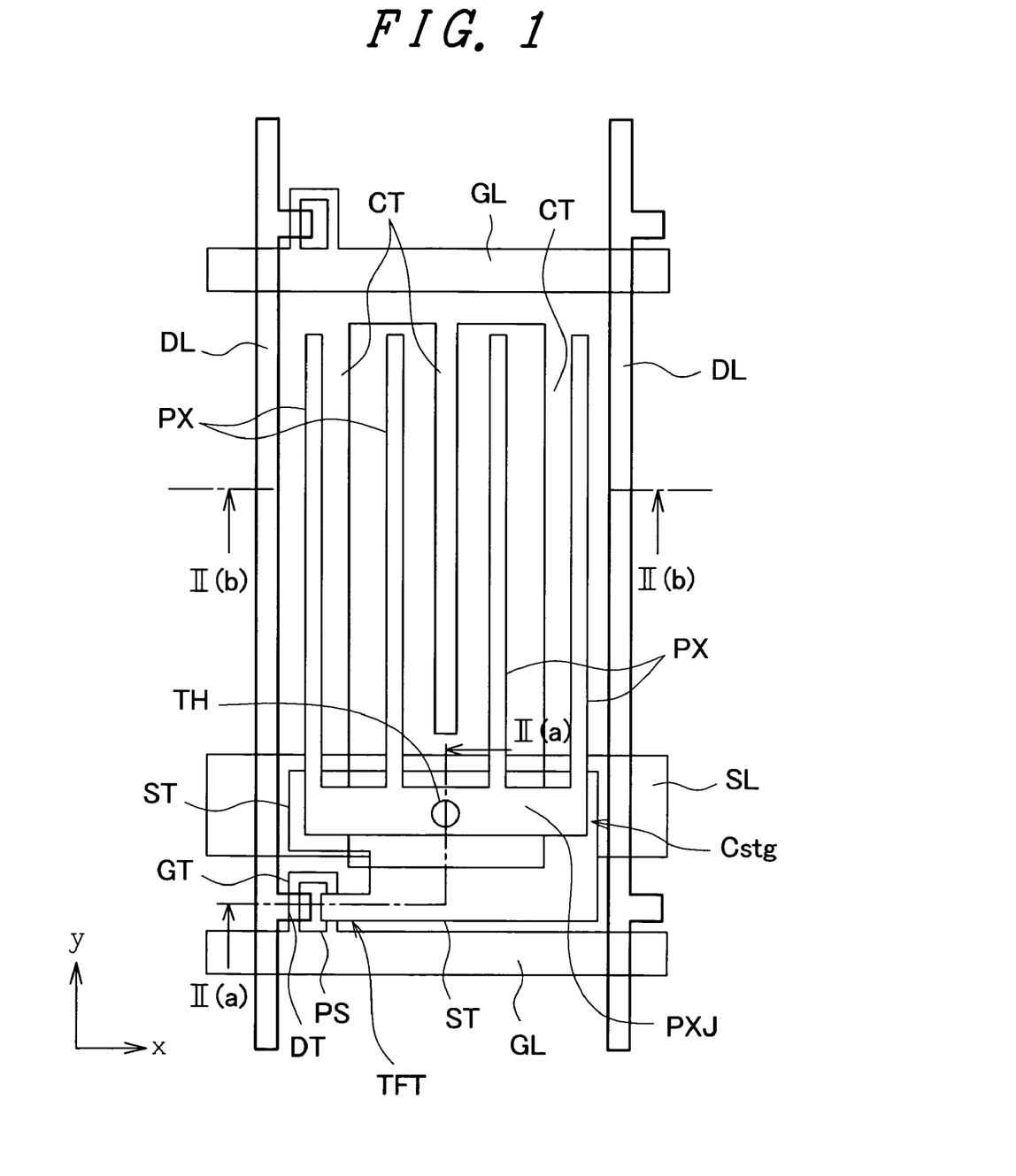
FIG. 1 is a plan view showing one embodiment of the constitution of a pixel region of a liquid crystal display device according to the present invention.
Figure 2A:
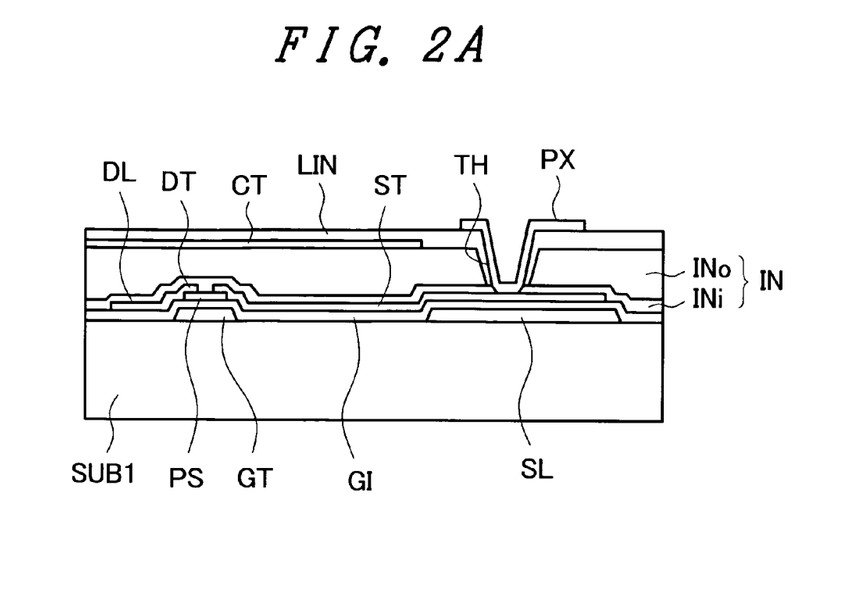
FIG. 2A is a cross-sectional view taken along a line II(a)-II(a) in FIG. 1.
Figure 2B:
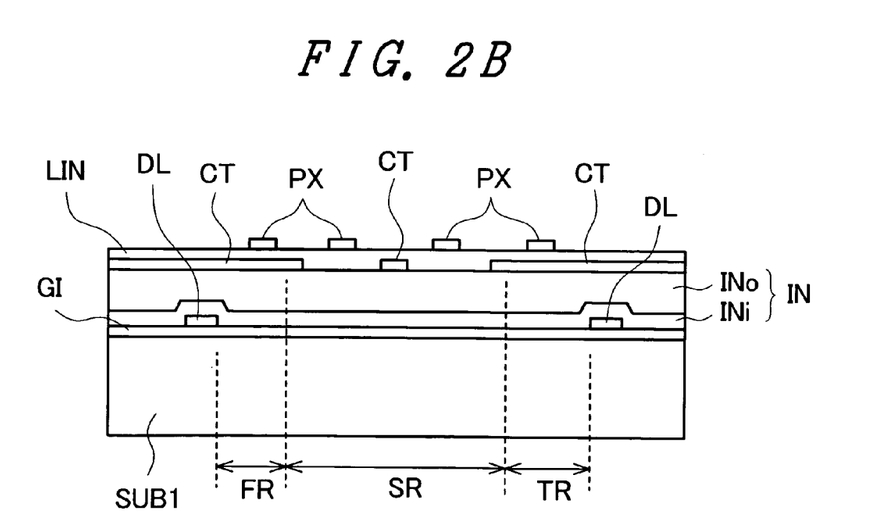
FIG. 2B is a cross-sectional view taken along a line II(b)-II(b) in FIG. 1.

FIG. 1 is a plan view showing one embodiment of the constitution of a pixel region of a liquid crystal display device according to the present invention. Further, FIG. 2A is a cross-sectional view taken along a line II(a)-II(a) in FIG. 1, and FIG. 2B is a cross-sectional view taken along a line II(b)-II(b) in FIG. 1.

A liquid crystal display device of the present invention includes a substrate (first substrate) SUB1, a counter substrate (second substrate) not shown in the drawing which is arranged to face the substrate SUB1 in an opposed manner, and a liquid crystal layer which is sandwiched between the substrate SUB1 and the counter substrate.

In FIG. 1, on a liquid-crystal-side surface (front surface) of the substrate (first substrate) SUB1, a pair of gate signal lines (scanning signal lines) GL which extends in the x direction in the drawing and is arranged parallel to each other in the y direction which intersects the x direction is formed. These gate signal lines GL surround a rectangular-shaped region together with a pair of drain signal lines (video signal lines) DL described later, and such a surrounded region constitutes a pixel region. Here, the gate signal line GL includes a projecting portion in a region where a thin film transistor (switching element) TFT described later is formed, for example, and the projecting portion functions as a gate electrode GT of the thin film transistor TFT.

Further, for example, a storage signal line SL is formed in a state that the storage signal line SL is arranged close to and parallel to the gate signal line GL on a lower side in the drawing. The storage signal line SL is formed simultaneously with the formation of the gate signal lines GL, for example, and is made of the same material as the gate signal line GL. A capacitance (capacitive element Cstg) is formed between the storage signal line SL and a source electrode ST described later.

On a front surface of the substrate SUB1, an insulation film GI (see FIG. 2A) is formed in a state that the insulation film GI also covers the gate signal lines GL and the storage signal line SL. The insulation film GI functions as a gate insulation film in a region where the thin film transistor TFT described later is formed. Further, the insulation film GI also functions as a dielectric film for the capacitive element Cstg in a region where the capacitive element Cstg is formed.

Further, on a front surface of the insulation film GI, a semiconductor layer PS made of, for example, amorphous silicon is formed. The semiconductor layer PS overlaps with the insulation film GI in a state that the semiconductor layer PS strides over the gate electrode GT.

The semiconductor layer PS constitutes a semiconductor layer of the thin film transistor TFT. By forming a drain electrode DT and the source electrode ST on an upper surface of the semiconductor layer PS, it is possible to constitute an MIS (Metal Insulator Semiconductor) type transistor having the inversely-staggered structure.

Here, the drain electrodes DT and the source electrodes ST are formed simultaneously with the formation of the drain signal lines DL. That is, the drain signal lines DL which extend in the y direction and are arranged parallel to each other in the x direction are formed, and portions of the drain signal lines DL extend over upper surfaces of the semiconductor layers PS so as to form the drain electrodes DT. Further, the source electrode ST is formed in a spaced-apart manner from the drain: electrode DT by an amount corresponding to a length of a channel of the thin film transistor TFT.

The source electrode ST extends over an upper surface of the insulation film GI from a surface of the semiconductor layer PS and includes a portion which overlaps with the storage signal line SL with a relatively large area. An overlapping portion of the source electrode ST and the storage signal line SL constitutes a capacitive element Cstg which uses the insulation film GI as a dielectric film.

On the front surface of the substrate SUB1, an insulation film IN (also referred to as a first insulation film in this specification) which is constituted of, for example, a stacked body consisting of an inorganic insulation film INi (see FIG. 2A and FIG. 2B) made of SiN or the like and an organic insulation film INo (see FIG. 2A and FIG. 2B) made of a resin or the like is formed in a state that the insulation film IN also covers the drain signal line DL, the drain electrode DT, and the source electrode ST. The organic insulation film INo is formed as an upper layer of the insulation film IN for leveling a surface of the insulation film IN, for example. Accordingly, it is not always necessary to form the organic insulation film INo. Further, the insulation film IN may be constituted of only the organic insulation film INo.

On a front surface of the insulation film IN, a counter electrode CT is formed. The counter electrode CT is constituted of a transparent conductive film such as an ITO (Indium Tin Oxide) film, an ITZO (Indium Tin Zinc Oxide) film, or an IZO (Indium Zinc Oxide) film.

Figure 3:
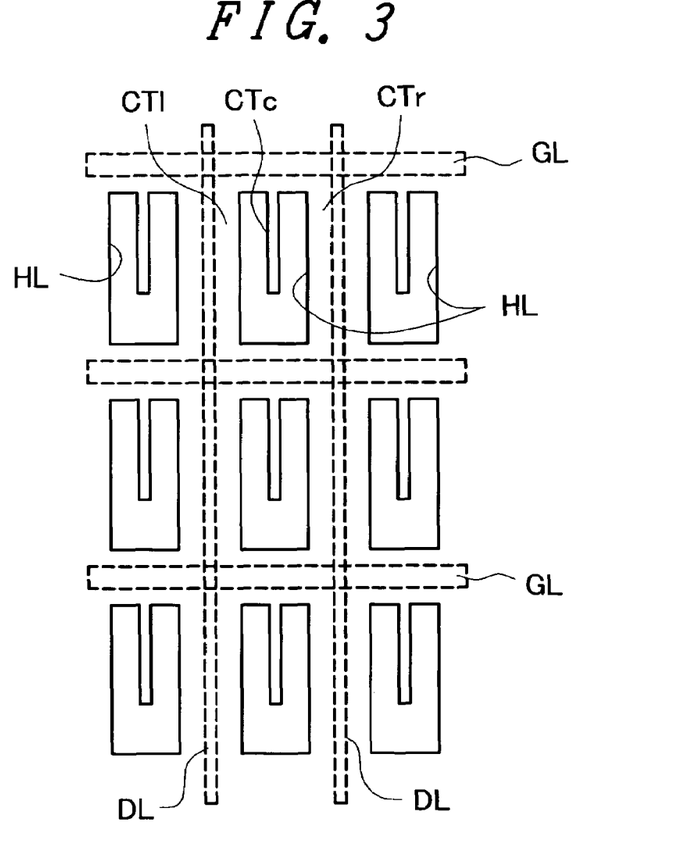
FIG. 3 is a plan view showing a pattern of a counter electrode which is formed in the pixel shown in FIG. 1.

As can be understood from a pattern of the counter electrode CT per se shown in FIG. 3, the counter electrode CT in the pixel region and counter electrodes CT in other pixel regions which are arranged at upper, lower, left and right sides of the pixel region are connected with each other. Here, in FIG. 3, the gate signal lines GL and the drain signal lines DL are indicated by a dotted line.

That is, in each pixel region, by forming a hole HL having a predetermined pattern in the transparent conductive film, for example, three counter electrodes which extend in the running direction of the drain signal lines DL are respectively formed parallel to each other in the running direction of the gate signal lines GL.

Out of three counter electrodes CT formed in each pixel region, the center counter electrode CT (indicated by symbol CTc in the drawing,: also referred to as a second counter electrode in this specification) is formed in a state that the center counter electrode CT is surrounded by the hole HL formed in the pixel region. Out of three counter electrodes CT formed in the same pixel region, the counter electrode CT on a left side of the drawing (indicated by symbol CTl in the drawing: also referred to as a first counter electrode in this specification) is formed in a region sandwiched between the hole HL in the pixel region and a hole HL formed in another pixel region arranged on a left side of the pixel region. Out of three counter electrodes CT formed in the same pixel region, a counter electrode CT on a right side of the drawing (indicated by symbol CTr in the drawing: also referred to as a first counter electrode in this specification) is formed in a region sandwiched between the hole HL formed in the pixel region and a hole HL formed in another pixel region arranged on a right side of the pixel region.

Due to such constitution, the counter electrode CTl on a left side of the drawing in each pixel region is configured to be connected with the counter electrode CTr on a right side of the drawing in another pixel region arranged on a left side of each pixel region in a state that the counter electrode CTl covers the drain signal line DL on a left side of the drawing in the pixel. Further, the counter electrode CTr on a right side of the drawing in each pixel region is configured to be connected with the counter electrode CTl on a left side of the drawing in another pixel region arranged on a right side of each pixel region in a state that the counter electrode CTr covers the drain signal line DL on a right side of the drawing in each pixel.

In other words, assuming two neighboring pixel regions which sandwich the drain signal line DL therebetween as one pixel region and another pixel region, the counter electrode CT is shared in common by one pixel region and another pixel region.

Here, as can be clearly understood later, the counter electrode CTc is configured to generate an electric field due to difference in potential between the counter electrode CTc and two linear pixel electrodes PX (second pixel electrodes described later) arranged with the counter electrode CTc sandwiched therebetween, and a line width of the counter electrode CTc is set to 2.5 μm or less (preferably set to 2.0 μm or less).

Further, as can be clearly understood later, the counter electrode CTl is configured to generate an electric field due to difference in potential between the counter electrode CTl and a linear pixel electrode PX (first pixel electrode described later) which is formed on the insulation film (interlayer insulation film LIN) in an overlapping manner with the counter electrode CTl. Here, the insulation film is formed so as to also cover the counter electrode CTl. A width of the counter electrode CTl is set corresponding to the number of pixel electrodes PX. Further, the counter electrode CTl is configured to generate an electric field also between the counter electrode CTl and a pixel electrode PX (second pixel electrode described later) which is arranged close to the counter electrode CTl at a position where the pixel electrode PX does not overlap with the counter electrode CTl due to difference in potential between the counter electrode CTl and the pixel electrode PX.

In the same manner as the counter electrode CTl, the counter electrode CTr is also configured to generate an electric field due to difference in potential between the counter electrode CTr and the linear pixel electrode PX (the first pixel electrode described later) which is formed on the above-mentioned insulation film (interlayer insulation film LIN) in an overlapping manner with the counter electrode CTr. A width of the counter electrode CTr is set corresponding to the number of pixel electrodes PX. Further, the counter electrode CTr is configured to generate an electric field also between the counter electrode CTr and the pixel electrode PX (second pixel electrode described later) which is arranged close to the counter electrode CTr at a position where the pixel electrode PX does not overlap with the counter electrode CTr due to difference in potential between the counter electrode CTr and the pixel electrode PX.

By returning to FIG. 1 again, on an upper surface of the counter electrode CT which is formed as described above, the interlayer insulation film LIN (see FIG. 2A and FIG. 2B: also referred to as a second insulation film in this specification) which is made of a resin, for example, is formed. The interlayer insulation film LIN constitutes an insulation film for ensuring the interlayer insulation between the counter electrode CT and the pixel electrode PX described later.

On an upper surface of the interlayer insulation film LIN, the pixel electrodes PX are formed. The pixel electrode PX is constituted of a transparent conductive film such as an ITO (Indium Tin Oxide) film, an ITZO (Indium Tin Zinc Oxide) film or an IZO (Indium Zinc Oxide) film.

The pixel electrode PX is formed of a plurality of linear electrodes which extends in the running direction of the drain electrode DL and is arranged parallel to each other at equal intervals in the running direction of the gate signal lines GL.

Within one pixel region, the pixel electrode PX is constituted of four linear electrodes, for example. The pixel electrode PX includes a connection portion PXJ on a thin-film-transistor-TFT-side end portion thereof and four linear electrodes are connected to the connection portion PXJ in common. The connection portion PXJ has a portion thereof (for example, a center portion of the connection portion PXJ) electrically connected with the source electrode ST of the thin film transistor TFT via a through hole TH formed in the interlayer insulation film LIN, the organic insulation film INo, and the inorganic insulation film INi.

Further, out of four pixel electrodes PX, the rightmost pixel electrode PX and the leftmost pixel electrodes PX, that is, two linear pixel electrodes PX which are arranged adjacent to the drain electrodes DL (also referred to as first pixel electrodes in this specification) are respectively formed in an overlapping manner with the counter electrodes CT (first counter electrodes CTl, CTr), and remaining two pixel electrodes PX (also referred to as second pixel electrodes in this specification) are arranged on both sides of the counter electrode CT (second counter electrode) which is arranged at the center of the pixel region so as not to overlap with the counter electrode CT. Out of the pixel electrodes PX, a line width of the second pixel electrode is set to 2.5 µm or less (preferably set to 2.0 µm or less). Out of the pixel electrodes PX, a line width of the first pixel electrode is set to 4.0 µm or less (preferably set to 2.5 µm or less).

In the liquid crystal display device having such constitution, as shown in FIG. 2B, the pixel region is divided into a first pixel region FR, a second pixel region SR, and a third pixel region TR in this order from the drain signal line DL on a left side of the drawing to the drain signal line DL on a right side of the drawing, for example. In the first pixel region FR and the third pixel region TR, a so-called IPS-Pro-type structure (hereinafter, referred to as IPS-Pro structure) is formed, while in the second pixel region SR, a so-called IPS-type structure in narrow meaning (hereinafter, referred to as IPS structure in narrow meaning) is formed.

To be more specific, in the first pixel region FR and the third pixel region TR, the pixel electrode PX (first pixel electrode) is linearly formed with a line width of 4.0 µm or less, and overlaps with the counter electrode CT (first counter electrode CTl, CTr) by way of the second insulation film, and the counter electrode CT are provided in a projecting manner on both sides of the linear pixel electrode PX (first pixel electrode) as viewed in a plan view. Further, in the second pixel region SR, the pixel electrode PX (second pixel electrode) is linearly formed with a line width of 2.5 µm or less, and does not overlap with the counter electrode CT, and the pixel electrode PX and the counter electrode CT are arranged alternately spaced-apart from each other as viewed in a plan view.

In the vicinity of a boundary between the first pixel region FR and the second pixel region SR, and in the vicinity of a boundary between the second pixel region SR and the third pixel region TR, the first counter electrodes CTl, CTr play a role of the counter electrode CT in the second pixel region SR.

Further, the number of second counter electrodes CTc in the second pixel region SR is set smaller than the number of second pixel electrodes PX by one. In this embodiment, the case in which the number of the second pixel electrodes PX is two is exemplified. However, when the number of the second pixel electrodes PX is one, it is unnecessary to form the second counter electrode CT.

In the above-mentioned pixel constitution, by supplying a scanning signal to the gate signal line GL on a lower side in the drawing, the thin film transistor TFT is driven (turned on), and the video signal from the drain signal line DL on a left side in the drawing is supplied to the pixel electrode PX via the thin film transistor TFT. The pixel electrode PX is configured to generate an electric field corresponding to difference in potential between the pixel electrode PX and the counter electrode CT to which a signal which becomes a reference with respect to the above-mentioned video signal is supplied.

Figure 4:
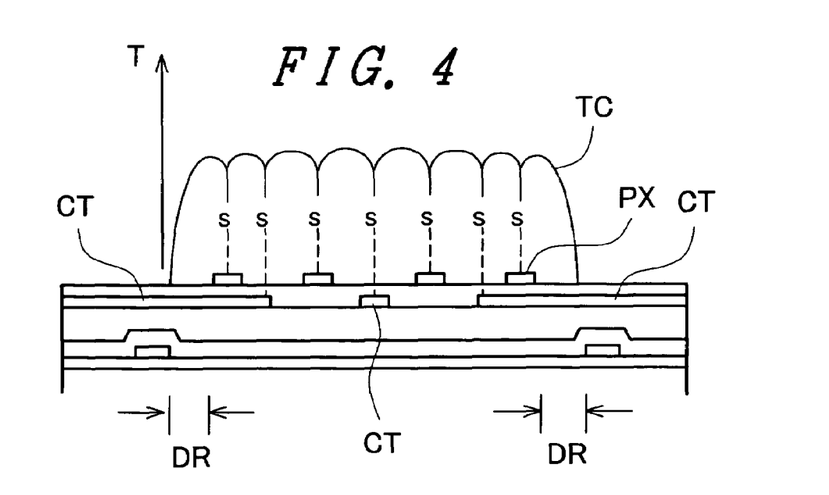
FIG. 4 is a view showing an optical transmissivity distribution curve of the pixel region shown in FIG. 1.

FIG. 4 shows an optical transmissivity distribution curve in the pixel region of the liquid crystal display device having the above-mentioned constitution, and is depicted corresponding to FIG. 2B which is a cross-sectional view. In FIG. 4, optical transmissivity T is taken on an axis of ordinates which becomes a standard of a value of the optical transmissivity distribution curve TC, and the optical transmissivity T becomes zero at a position corresponding to a height of a surface of the pixel electrode PX.

As can be clearly understood by a comparison of the optical transmissivity distribution curve TC acquired by the pixel structure of this embodiment with the optical transmissivity distribution curve TC acquired by using only the so-called IPS structure in narrow meaning and the optical transmissivity distribution curve TC acquired by using IPS-Pro structure in the whole pixel region explained in conjunction with FIG. 5B and FIG. 6B respectively, it is found that the value of the optical transmissivity distribution curve TC of this embodiment is enhanced as a whole.

This is because, in the second pixel region SR which adopts the IPS structure in narrow meaning, the line width of the linear electrodes which constitute the second counter electrode CT and the line width of the linear electrodes which constitute the second pixel electrode PX are respectively set to 2.5 µm or less (desirably 2.0 µm or less) thus facilitating the driving (rotation) of liquid crystal molecules on each electrode. By setting the line width of the electrode in the IPS structure in narrow meaning to 2.5 µm or less, the optical transmissivity can be enhanced compared to the case which adopts the IPS-Pro structure. It is desirable to set the line width as small as possible provided that forming accuracy and reliability of the manufacture is ensured.

Further, extremely small portions (indicated by s) of the optical transmissivity distribution curve which are recognized as dark lines are reduced in an amount in the center portion (second pixel region SR) of the pixel region compared to the case which adopts the IPS-Prostructure. This is because, in the second pixel region SR, the extremely small portions "s" are generated only above the pixel electrodes PX and the counter electrodes CT which are spaced apart from each other and are not generated at a place between the pixel electrode PX and the counter electrode CT. On the other hand, in the first pixel region FR and the third pixel region TR, an amount of dark lines is increased compared to the second pixel region SR. However, the first pixel region FR and the third pixel region TR constitute a portion of the pixel region and hence, an amount of dark lines can be reduced as a whole compared to the case where the whole pixel region is constituted of the IPS-Pro structure.

Further, in the first pixel region FR and the third pixel region TR, the counter electrode CT is formed so as to sufficiently cover the drain signal line DL. Accordingly, the counter electrode CT can reliably block noises and a leaking electric field to the pixel electrode PX from the drain signal line DL. Further, since the IPS-Pro structure is adopted, also with respect to a region (indicated by symbol DR in FIG. 4) defined between the drain signal line DL and the pixel electrode PX (first pixel electrode) arranged adjacent to the drain signal line DL as viewed in a plan view, a portion of the region closer to the drain signal line DL is also allowed to function as a display region compared to the case which adopts the IPS structure in narrow meaning so that the optical transmissivity can be enhanced (see FIG. 4, FIG. 5B, FIG. 6B). There arises no problem even when the line width of the first pixel electrode is set slightly larger than the line width of the second pixel electrode. However, when the line width of the first pixel electrode is excessively large, the optical transmissivity is decreased. Accordingly, the line width of the first pixel electrode is set to 4.0 µm or less, and desirably 2.5 µm or less. It is needless to say that the line width is preferably set to a value as small as possible provided that forming accuracy and reliability of the manufacture is ensured.

In this specification, a pattern in which the pixel electrodes PX and the counter electrodes CT extend in the running direction of the drain signal lines DL is adopted. However, from the gist of the present invention, the strict parallelism is not necessary with respect to the arrangement of the pixel electrodes PX and the counter electrodes CT and it is construed that the pixel electrodes PX and the counter electrodes CT extend in the running direction of the drain signal lines DL even when the pixel electrodes PX and the counter electrodes CT are inclined relative to the running direction of the drain signal lines DL within ±5 degrees.

Embodiment 2

In the above-mentioned embodiment 1, the case in which the pixel electrode PX includes four linear electrodes (two first pixel electrodes PX and two second pixel electrodes PX) within one pixel region is exemplified as a typical example. However, the number of linear electrodes is not limited. For example, it is sufficient that the number of second counter electrode CTc in the second pixel region SR is smaller than the number of second pixel electrodes PX by one and hence, the number of second pixel electrodes PX may be 3 or more. Further, when the number of second pixel electrodes PX is one, it is unnecessary to provide the second counter electrode CTc. The number of the first pixel electrodes PX in the first pixel region FR and the number of the first pixel electrodes PX in the third pixel region TR may be respectively set to two or more. That is, the number of pixel electrodes PX formed above a planar counter electrode CT in an overlapping manner may be set to two or more on one side of the pixel region.

Embodiment 3

In the above-mentioned embodiment, a pattern in which the pixel electrode PX and the counter electrode CT extend linearly in the running direction of the drain signal lines DL is adopted. However, the present invention is not limited to such a pattern. For example, with respect to the pixel electrode PX and the counter electrode CT, a bent portion may be formed in a part of each electrode in the extending direction. It is because the present invention is also applicable to a case in which, to obviate the generation of coloring on a display screen depending on a viewing direction, a so-called multi-domain method is adopted so as to divide a pixel region into two regions, that is, upper and lower regions, for example, and the extending directions of the pixel electrode PX and the counter electrode CT are made different from each other in the respective regions. In this case, drain signal lines DL may be also extended in a bent shape.

Although the present invention has been explained in conjunction with several embodiments heretofore, the constitutions explained in the respective embodiments above constitute merely examples, and the present inventions can be suitably modified without departing from the technical concept of the present invention. Further, the constitutions explained in conjunction with respective embodiments may be carried out in combination unless the constitutions contradict each other.

What is claimed is:
1. A liquid crystal display device comprising:
a first substrate;
a second substrate; and
a liquid crystal layer sandwiched between the first substrate and the second substrate, wherein
the first substrate includes a plurality of scanning signal lines; a plurality of video signal lines which intersects the plurality of scanning signal lines, a first insulation film which is formed above the video signal lines, a counter electrode which is formed above the first insulation film, a second insulation film which is formed above the counter electrode, and a pixel electrode which is formed above the second insulation film and to which a video signal is supplied from the video signal line via a switching element,
the liquid crystal layer is configured to be driven by an electric field generated due to difference in potential between the pixel electrode and the counter electrode,
the video signal line is covered with the counter electrode by way of the first insulation film, and
one pixel region sandwiched between two video signal lines arranged adjacent to each other is divided into a first pixel region, a second pixel region and a third pixel region in order from one video signal line to another video signal line, wherein
in the first pixel region and the third pixel region, the pixel electrode has a linear pixel electrode and has a line width of 4.0 µm or less and overlaps with the counter electrode by way of the second insulation film, and the counter electrode is provided in a projecting manner on both sides of the linear pixel electrode as viewed in a plan view, and in the second pixel region, the pixel electrode has a linear pixel electrode and has a line width of 2.5 μm or less and does not overlap with the counter electrode, and the pixel electrode and the counter electrode are alternately arranged to in a spaced-apart manner from each other in a plan view.

2. A liquid crystal display device according to claim 1, wherein the pixel electrode has a line width of 2.0 μm or less in the second pixel region.

3. A liquid crystal display device according to claim 1, wherein the pixel electrode has a plurality of linear pixel electrodes within said one second pixel region, and the counter electrode has a plurality of linear counter electrodes within the second pixel region, wherein a line width of the linear counter electrode is set to 2.5 μm or less and the number of linear counter electrodes is set smaller than the number of plurality of linear pixel electrodes by one.

4. A liquid crystal display device according to claim 3, wherein the linear counter electrode has a line width of 2.0 μm or less in the second pixel region.

5. A liquid crystal display device according to claim 1, wherein the pixel electrode has only one linear pixel electrode within said one second pixel region, and the counter electrode in the first pixel region and the counter electrode in the third pixel region also function as the counter electrode in the second pixel region.

6. A liquid crystal display device according to claim 1, wherein assuming two pixel regions arranged adjacent to each other while sandwiching the video signal line therebetween as one pixel region and another pixel region, the counter electrode is shared in common by said one pixel region and said another pixel region.

7. A liquid crystal display device according to claim 1, wherein each one of the counter electrode and the pixel electrode respectively has a bent portion at a part of a portion thereof which extends in the running direction of the video signal line.

8. A liquid crystal display device comprising:
a first substrate;
a second substrate; and
a liquid crystal layer sandwiched between the first substrate and the second substrate, wherein
the first substrate includes a plurality of scanning signal lines; a plurality of video signal lines which intersects the plurality of scanning signal lines, a first insulation film which is formed above the video signal lines, a counter electrode which is formed above the first insulation film, a second insulation film which is formed above the counter electrode, and a pixel electrode which is formed above the second insulation film and to which a video signal is supplied from the video signal line via a switching element,
the liquid crystal layer is configured to be driven by an electric field generated due to difference in potential between the pixel electrode and the counter electrode,
the counter electrode includes a first counter electrode which extends in the running direction of the video signal line, has a width larger than a width of the video signal line, and covers the video signal line by way of the first insulation film, the pixel electrode includes, within one pixel region, two first pixel electrodes which extend in the running direction of the video signal line, and one or a plurality of second pixel electrodes which is arranged between the two first pixel electrodes and extends in the running direction of the video signal line, and assuming the two first counter electrodes arranged adjacent to each other as one first counter electrode and another first counter electrode respectively and assuming the two first pixel electrodes as one first pixel electrode and another first pixel electrode, said one first pixel electrode overlaps with said one first counter electrode by way of the second insulation film, said another first pixel electrode overlaps with said another first counter electrode by way of the second insulation film, the second pixel electrode is arranged between said one first counter electrode and said another first counter electrode such that the second pixel electrode does not overlap with the counter electrode, an end portion of said one first counter electrode is positioned between said one first pixel electrode and said second pixel electrode, and an end portion of said another first counter electrode is positioned between said another first pixel electrode and said second pixel electrode as viewed in a plan view, and the first pixel electrode is linearly formed and has a line width of 4.0 μm or less, and the second pixel electrode is linearly formed and has a line width of 2.5 μm or less.

9. A liquid crystal display device according to claim 8, wherein the line width of the second pixel electrode is set to 2.0 μm or less.

10. A liquid crystal display device according to claim 8, wherein the pixel electrode has the plurality of second pixel electrodes within said one pixel region, the counter electrode has one or a plurality of second counter electrodes which extends in the running direction of the video signal line between said one first counter electrode and said another first counter electrode, the second pixel electrode and the second counter electrode are alternately arranged while preventing the second pixel electrode and the second counter electrode from overlapping with each other, and the second counter electrode is formed linearly and has a line width of 2.5 μm or less.

11. A liquid crystal display device according to claim 10, wherein the line width of the second counter electrode is set to 2.0 μm or less.

12. A liquid crystal display device according to claim 8, wherein the pixel electrode has only one second pixel electrode within said one second pixel region.

13. A liquid crystal display device according to claim 8, wherein assuming two pixel regions arranged adjacent to each other while sandwiching the video signal line therebetween as one pixel region and another pixel region, the first counter electrode is shared in common by said one pixel region and said another pixel region.

14. A liquid crystal display device according to claim 8, wherein each one of the counter electrode and the pixel electrode respectively has a bent portion at a part of a portion thereof which extends in the running direction of the video signal line.

* * * * *